Patented Nov. 11, 1941

2,262,229

UNITED STATES PATENT OFFICE 2,262,229

PIGMENT AND METHOD OF PREPARATION

Vito Giambalvo, Brooklyn, N. Y., assignor to Interchemical Corporation, New York, N. Y., a corporation of Ohio No Drawing. Application June 24, 1939,
Serial No. 280,977

4 Claims. (Cl. 106—308)

This invention relates to the production of pigments which are precipitated from sulfuric acid solutions, and has particular reference to a new method of preparing such pigments, whereby pigment is obtained of much greater strength and more ready dispersability in organic media.

Certain pigments—in particular acid stable metallo-phthalocyanines and vat dyestuffs—are conventionally prepared by a process known as acid pasting, in which the pigments are dissolved in strong sulfuric acid and the solutions are then run into large quantities of water to precipitate the pigment powder.

It has been proposed to improve the properties of these pigments by precipitating them in the presence of a dispersing agent, preferably in combination with emulsified water-immiscible liquids, in order to improve their color strength and dispersability. The production of pigments coated with such agents is, however, open to the objection that the coating liquid is sometimes objectionable in certain coating compositions, making the pigment undesirable for such uses.

I have discovered that pigments of this type may be improved in strength and dispersibility, without loss of any otherwise desirable properties, by precipitating them in the presence of an emulsion of a water-immiscible alkali soluble material, preferably an organic film-forming acid liquid at the precipitation temperature, and then washing out the fatty acid with an aqueous alkaline material, and recovering the pigment, which appears to retain a mono-molecular layer of soap thereon.

Practically any liquid water-immiscible acid may be used; I have been particularly successful with the liquid fatty and naphthenic acids. Stearic acid, and similar normally solid fatty acids which melt below 100° C. have also proved suitable.

As little as 2½% of liquid, based on the finished pigment, produces a substantial increase in yield, an increase in strength and improved color; but I prefer to add as much oil as I can while still producing a pigment which can be filtered readily. This varies with the individual pigments, but I have found that amounts in excess of 20% are dangerous with most pigments. In general, filtration is retarded to such an extent above this point that amounts in excess of this should be avoided.

Practically any emulsifying agent can be used, which will properly emulsify the oil, since these wash out when the precipitated pigment is filtered and washed. Typical suitable emulsifying agents are glue, mahogany sulfonates, and triethanolamine soaps.

Typical examples of my invention are the following:

Example 1

10 parts of copper phthalocyanine are added to 100 parts of sulfuric acid mono-hydrate at 30–45° C. The solution is stirred for ½ hour until the dyestuff is completely dissolved. The solution is introduced with vigorous agitation into 2000 parts of water at 90–95° C., containing 1.0 part of oleic acid emulsified with 0.2 part of triethanolamine stearate. The resulting mass is digested with good stirring for ½ hour, allowed to settle, decanted and washed acid free to Congo red by repeated decantations. 0.2 part of sodium hydroxide are added with good stirring and allowed to digest for ½ hour, filtered, washed alkali free to phenolphthalein and dried at 180° F. for 24 hours. A soft grinding pigment of great strength resulted.

Example 2

The procedure of Example 1 was followed with 5:7:5':7' tetrabromoindigotin (Brilliant Indigo 4BA), using an emulsion of 1.0 part of linseed oil fatty acids, emulsified in 2000 parts of water with 0.2 part of triethanolamine abietate. A pronounced increase in pigment strength was observed.

Example 3

A similar improvement was observed with N-dihydro 1:2:1':2' anthraquinone azine, using the method of Example 1, except that the oleic acid wash washed out with soda ash.

Example 4

Example 1 was repeated, using 1-benzoyl amino 4-methoxy anthraquinone, with good results.

While I have shown but a few examples of my process, other pigments which can be prepared by acid pasting may be treated in a similar manner to produce similar increases in strength and color. The vat dyestuffs, and the acid stable metallo-phthalocyanines can be treated in this manner. The process may be used for pigments of this class, whether precipitated from sulfuric acid, or from other acids ordinarily used in the process, such as chloracetic acid, chlorosulphonic acid, phosphoric acid and the like.

I claim:

1. The method of producing a pigment, soluble in concentrated sulfuric acid and recoverable therefrom without decomposition on dilution, from a solution thereof in concentrated acid, which comprises mixing the acid solution with an aqueous diluent containing therein an emulsion of a water immiscible material liquid at the temperature of the aqueous diluent and which dissolves in aqueous alkali with the formation of a water-soluble alkali metal soap, recovering the precipitated pigment, and washing it with dilute alkali to remove the bulk of the water-immiscible liquid.

2. The method of producing a pigment, soluble in concentrated sulfuric acid and recoverable therefrom without decomposition on dilution, from a solution thereof in concentrated acid, which comprises mixing the acid solution with an aqueous diluent containing therein an emulsion of from about 2½ to 20%, based on pigment weight, of a water-immiscible film-forming acid liquid at the temperature of the aqueous diluent and which dissolves in aqueous alkali with the formation of a water-soluble alkali metal soap, recovering the precipitated pigment, and washing it with dilute alkali to remove the bulk of the water-immiscible liquid.

3. The method of claim 2, in which the pigment is one of the class consisting of acid-stable metallo-phthalocyanines, and vat dyestuffs.

4. The method of claim 2, in which the pigment is copper phthalocyanine.

VITO GIAMBALVO.